Figure 1:
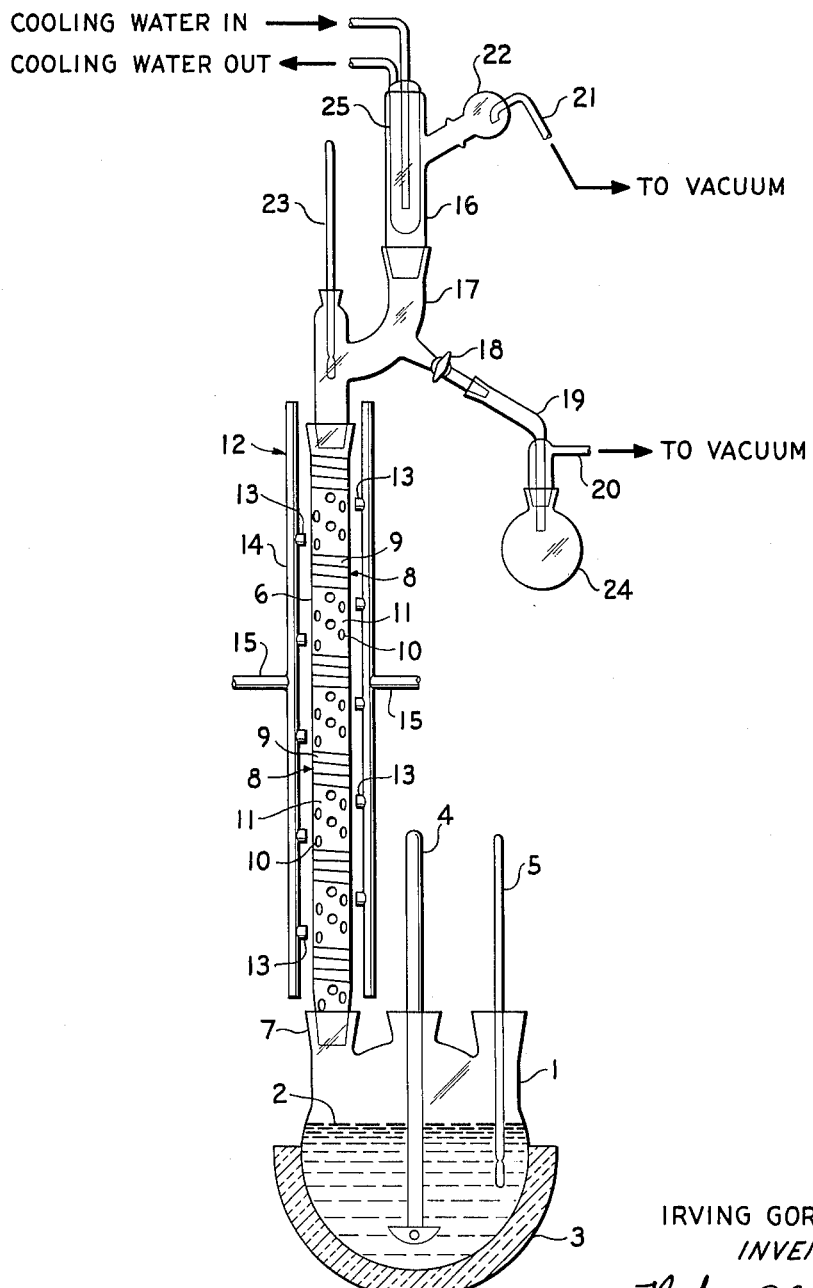
Figure 2:
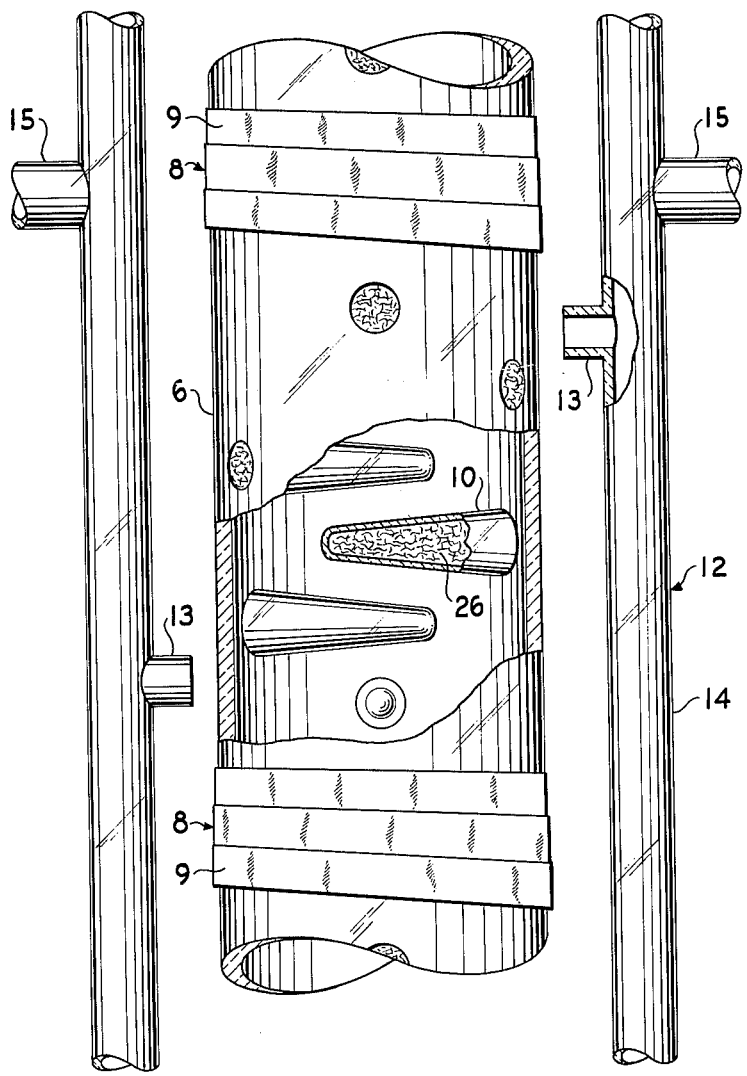

March 15, 1966  I. GORDON  3,240,682
RECTIFICATION STILL

Filed Oct. 31, 1961  2 Sheets-Sheet 1

IRVING GORDON
INVENTOR

ATTORNEY 3,240,682
RECTIFICATION STILL
Irving Gordon, Niagara Falls, N.Y., assignor to Hooker Chemical Corporation, Niagara Falls, N.Y., a corporation of New York
Filed Oct. 31, 1961, Ser. No. 148,931
6 Claims. (Cl. 202—158)

This invention relates to a rectification column or still. More particularly this invention resides in a novel structure and process for distillation.

The structure of this invention comprises a rectification still having in combination both thermal and contact rectification components. In prior art structures, it is known to combine thermal and contact rectification in the same system in laboratory structures, however the rectification column includes moving parts such as movable tubes, brushes, etc. The structure herein described provides a novel system whereby the distillation column combines thermal and contact rectification without the use of any moving parts in the column.

By thermal rectification it is generally meant a system whereby the separation of two or more components is accomplished in essence by a series of multiple redistillations; or by repeated partial vaporizations of liquid or partial condensations of vapor or both.

By contact rectification it is generally meant a system whereby the separation of two or more components is accomplished by a system whereby rising vapor and descending liquid are brought into intimate contact or equilibrium with suitable contacting surfaces (such as packing materials, etc.). More specifically, contact rectification is a process of fractional distrillation involving the separation of liquids of different boiling points or volatilities in which rising vapors and descending liquid are brought into intimate contact on any desired contacting surface and in which transfer of material takes place from one phase to the other because of the spontaneous tendency to approach equilibrium compositions. This process of contact rectification involves the transfer of material between an ascending vapor stream and a descending liquid stream.

The vapor at any point has less than the theoretical concentration of the "light" or low boiling component; therefore there is a transfer of "light" material to the vapors, and of "heavy" material to the liquid at their points of contact.

The above prior art systems with component moving parts are much more difficult to operate, and are considerably more expensive than the system of this invention which excludes these moving parts. Also since these moving parts cause wear, the maintenance and durability of these prior art structures leave much to be desired. A further disadvantage of the presently available rectification systems is that these systems are incapable of feasibly being adapted to a commercial scale. Therefore presently there are no available systems adapted to separate heat sensitive liquids (in high vacuum ranges) from each other using a combination of thermal and contact rectification. The present invention provides a system that can be made or set up on a commercial scale, whereby thermal and contact rectification components are combined without the need or necessity of moving parts in the column.

The following drawings and examples are intended to more specifically define the invention. While these illustrations and examples specify the preferred embodiments, they are not intended to be limiting to the particulars therein defined. Many modifications will become apparent to one skilled in the art upon a reading of this disclosure; these modifications are intended to be encompassed by this invention.

FIGURE I is a diagrammatic view illustrating a rectification system of this invention.

FIGURE II is an enlarged view of the distillation column illustrating the hot and cool zones.

Referring to FIGURES I and II, a three-necked flask 1 containing crude feed 2 is positioned in a heating mantle 3. Any convenient heating means however may be used in place of the mantle. A stirrer 4 is immersed into flask 1 and is adapted to agitate or stir crude feed mix 2. The crude feed mix 2 contains the thermally sensitive components to be separated. By heating crude feed mix 2, mix 2 evaporates into the column 6. The residue in the flask 1 is continuously stirred (and evaporated) by the action of stirrer 4. When the vapors enter the column 6 they are subjected to the rectifying action of cool zones 11 and heating zones 8, and glass contacting protuberances 10. A pot thermometer 5 is immersed into crude feed 2 to indicate the temperature of the crude mix. A thermal-contact rectification column 6 is inserted into a neck 7 positioned in the upper portion of flask 1. Said column 6 comprises a series of vertically disposed chambers defining alternately hot 8 and cool zones 11, respectively. Hot zone 8 comprises a wrapping 9 disposed circumferentially around the outer face of column 6. Wrapping 9 has positioned therein a heating means (such as wires, etc., electrically connected to a source of current) adapted to heat and maintain zone 8 in a heated condition. Projecting inwardly from the outer face of column 6 are a plurality of contacting protuberances 10 open on their outward base ( coextensive with the outer face of column 6) and tapering to a point inward of the interior of column 6. (See in more detail FIGURE II.) These contacting protuberances 10 are filled with a heat conductive substance such as aluminum foil 26 (or metal, graphite, and the like.) These contacting protuberances 10 act as contact rectification devices within the column 6 and also act as effective heat transfer devices in either the hot zones 8 or cold zones 11. Cold zones 11 comprise portions of column 6 exposed to the atmosphere, without any wrappings as cover the hot zones. Immediately adjacent and vertically parallel thereto are air manifold means 12 provided therein with air outlets 13. Air outlets 13 are positioned immediately adjacent to cold zones 11 and adapted to direct the current of escaping air directly to the outer surface of cold zones 11. This cold air maintains these zones at a temperature substantially below the temperature of hot zones 9. Any number of air manifold means 12 may be used in the structure of this invention. These illustrated manifolds consist of vertically disposed apertured tubes 14 supplied with air from a compressor. In said tubes are apertures or air outlets 13 positioned directly over the air cooled zones 11. During operation of the column the air is supplied to the air manifold at the proper rate and temperature to obtain the desired amount of cooling of cold zones 11. Provided at the side of tube 14 opposite to the side adjacent column 6 is an air feed means 15 into which the air enters the manifold from an air source (air source not shown in drawing.) A water condenser 16 is positioned in and at the top of column 6, and adapted to condense the vapors from the column 6. A large K shaped head 17 is used as a reflux splitter by manipulation of stopcock 18 where any desired reflux ratio may be obtained. In tube 19 a vacuum take off 20 is provided and connected to any source of vacuum. A vacuum take off 21 is also provided in take-off collector 22. Inserted into the condenser is a temperature indicating means 23 adapted to obtain the temperature of distillate or refluxing mixture. A distillate receiver 24 receives and stores the condensed distillate. A finger condenser 25 is positioned internally of water condenser 16.

The thermal-contact rectification column 6 embodies the heating tape wound zones 8 which are the hot zones heated to the desired temperature by the electric heating tape and the air cooled zones 11 which are as mentioned above cold zones kept cool to the desired temperature by air blasts from the above described air-manifolds 12. These hot and cold zones embody the elements of the thermal rectification operation of the column wherein the hot zones act as a series of reboilers to distill and redistill the liquid portions of the equilibrium mixtures, whereas the cold portions serve to condense and recondense the vapor portions of the equilibrium mixture. The combined activity of these zones effect a thermal rectification of the equilibrium mixture. In addition, the heat transfer of both the hot and cold zones is greatly accelerated by the presence of the aluminum foil packed contacting protuberances 10 which also act as contact rectification devices.

While the drawing illustrates the cool zones as being air cooled, they may be cooled by an appropriate means such as cold water, refrigerants and the like. Conversely the hot zones may be heated by hot water, steam, or other convenient heating means. The contents of the still are constantly kept under vacuum applied through vacuum take offs 20 and 21.

The above described thermal-contact column may be utilized in the range of .1 to one hundred mm., but a range of .1 to 20 mm. is most suitable. This range would not be suitable for nor could it be used in the conventional "molecular stills" and would be too low for the usual packed columns or bubble cap or sieve plate columns. A further advantage of the above defined system is that it has a relatively low pressure drop throughout, and may be easily adjusted and controlled. The fact that there are no moving parts in the system, prolongs the useful life of the structure and makes the cost and maintenance relatively low. The heat transfer is extremely efficient due in large measure to the aluminum packed glass chambers. Materials such as high boiling substances are ideally adapted to the vacuum rectification of the structure of this invention, however, this system is easily adapted for use with a wide range of materials. The illustrated system of this invention defines the general and basic concepts of the present invention, these concepts can and have been easily adapted for commercial operation on a large scale.

In operation, the vapors rising from the crude feed 2 are subjected to the contact rectification of the glass contacting protuberances 10 in a cool zone 11. Then the rising vapor and descending liquid are brought into intimate contact and transfer of material takes place from one place to the other (enrichment) because of the fundamental tendency to approach equilibrium conditions.

The vapor from this cool zone 11 now rises to a heating zone 8 where in addition to the contact rectification effected by the glass contacting protuberances 10, the liquid descending from the upper portions of the column will be partially vaporized in this heating zone 8. The enriched vapors now rise to another cooling zone 11 where again in addition to the contact rectification effected by the glass contacting protuberances 10, a partial condensation of vapor takes place. The cooling zones 11 are chilled by the air coming from holes in an air tube 14. Continuing on, this repeated partial vaporization of liquid and partial condensation of vapor effects enrichment and is a definition of thermal rectification.

In addition to effecting contact rectification, the glass contacting protuberances 10 act as heat transfer devices to bring heat into or remove heat from the column. The heat conducting substance filling the cores of the glass contacting protuberances aid in the above-described heat transfer.

Thus, under the highly nonadiabatic conditions of this thermal-contact rectification column 6, the maximum efficiency of the combined thermal and contact rectification are obtained. The thermal-contact rectification system operating in the pressure range of about .1 to 20 mm. has a calculated H.E.T.P. of about 3 inches.

The vapors leaving the column 6 are condensed in a suitable condenser 22 from which the condensate is either returned to the column 6 as reflux or taken off as distillate depending on the reflux ratio set by stopcock 18 in reflux splitter 17.

FIGURE 1 is a diagram of the laboratory Thermal Contact Rectification Still involving a column with heated and cooled zones. The column itself is an intricately modified contact column consisting of glass protuberances extending in excess of halfway across the column and arranged in a random order. The protuberances are filled with a heat conducting substance such as packed aluminum foil. The hot zones on the column may be heated by any suitable means such as by electrical heating tapes. The cold zones may be cooled by any suitable means such as by an air blast or circumferential radial fins. In operation rectification is effected by a combination of the thermal rectification of the hot and cold zones (where each hot zone acts as the reboiler and each cold zone as the condenser) and of contact rectification involving the glass protuberances (aluminum foil packed modified Vigreux depressions).

GENERAL OPERATION OF THE THERMAL CONTACT RECTIFICATION STILL (cf. FIG. 1)

The ingredients to be separated are placed in the feed flask. The system (compare FIG. 1) is now subjected to the desired vacuum (0.1 mm. to 100 mm.) and the pot is heated to the boiling point with stirring. While on total reflux the column is thoroughly wetted with the refluxing components. The hot zones are now heated at a relatively high temperature above that in the pot, and the cold zones are cooled with air blasts from the air manifold. After column equilibrium has been established (massive refluxing in the cold zones is to be desired) the controlling stopcock is adjusted at the desired reflux ratio while still retaining a suitable amount of refluxing in the cold zones. The fractionation is now carried out in the standard manner taking fractions as desired.

The following examples more specifically define further particulars of this invention.

*Example 1. — Fractional distillation of dibutylphenyl phosphite (>ninety percent pure) from a mixture of tributyl phosphite, dibutylphenyl phosphite, and diphenylbutyl phosphite*

A mixture (2905 grams) of tributyl phosphite, dibutylphenyl phosphite, and diphenylbutyl phosphite was placed in a stirred five liter, three necked flask, and the three components were separated by means of a fractional vacuum distillation through the thermal contact rectification column of this invention.

(The fractional distillation was carried out in a manner similar to that described above under "General Operation of the Thermal Contact Rectification Still.")

A forecut was taken which consists mostly of tributyl phosphite. The residue was mainly diphenylbutyl phosphite.

The main fraction, dibutylphenyl phosphite was separated in the Thermal Contact Rectification Column of this invention with the result given below:

| Compound | Composite Weight, grams | Average Conditions | | | $n_d^{25}$ | Purity, percent |
| --- | --- | --- | --- | --- | --- | --- |
| | | Pot, °C | Head °C | Vac., mm. | | |
| Dibutylphenyl Phosphite | 1,080 | 150 | 125 | 1 | 1.483 | >92 |

The above pure fraction of dibutylphenyl phosphite analyzed better than ninety two percent pure by gas chromatography. The use of a packed column of similar size filled with one-quarter inch glass helices to separate the above components was unsuccessful under similar conditions.

*Example 2.—Fractional distillation of dibutylphenyl phosphite (>ninety percent pure) from a mixture of tributyl phosphite, dibutylphenyl phosphite, and diphenylbutyl phosphite*

A mixture (3810 grams) of composition similar to the feed of Example 1 was subjected to a fractional vacuum distillation by the Thermal Contact Rectification Column of this invention with the results given below. (A similar forecut and residue were obtained—cf. Example 1.)

| Compound | Composite Weight, grams | Average Conditions | | | $n_d^{25}$ | Purity, percent |
|---|---|---|---|---|---|---|
| | | Pot, °C | Head °C. | Vac., mm. | | |
| Dibutylphenyl Phosphite | 1,657 | 150 | 135 | 1¾ | 1.483 | >90 |

*Example 3.—Fractional distillation of dibutylphenyl phosphite (>ninety percent pure) involving separation of tributyl phosphite, dibutylphenyl phosphite, and diphenylbutyl phosphite*

A mixture (7000 grams) of composition similar to the feed of Example 1 was subjected to a fractional vacuum distillation by the Thermal Contact Rectification Column of the invention with the results given below. (A similar forecut and residue were obtained—cf. Example 1).

| Compound | Composite Weight, grams | Average Conditions | | | $n_d^{25}$ | Purity, percent |
|---|---|---|---|---|---|---|
| | | Pot, °C | Head °C. | Vac., mm. | | |
| Dibutylphenyl Phosphite | 3,918 | 130 | 110 | .5 | 1.483 | >90 |

*Example 4.—Fractional distillation of diallyphenyl phosphite (>ninety-five percent pure) and diphenylallyl phosphite (>eighty percent pure) involving separation of triallyl phosphite, diallylphenyl phosphite, and diphenylallyl phosphite*

A mixture (9940) grams of triallyl phosphite, diallylphenyl phosphite, and diphenylallyl phosphite was placed in a stirred twelve liter, three necked flask and the three components were subjected to a fractional vacuum distillation through the Thermal Rectification Column of this invention.

(The fractional distillation was carried out in a manner similar to that described above under "General Operation of the Thermal Contact Rectification Still.")

A forecut was taken which consisted mainly of triallyl phosphite, while the residue was mainly diphenylallyl phosphite.

The main fractions, diallylphenyl phosphite and diphenylallyl phosphite were separated with the results given below:

| Compound | Composite Weight, grams | Average Conditions | | | $n_d^{25}$ | Purity, percent |
|---|---|---|---|---|---|---|
| | | Pot, °C | Head °C. | Vac., mm. | | |
| Diallylphenyl Phosphite | 2,028 | 145 | 100 | .5 | 1.51 | 95 |
| Diphenylallyl Phosphite | 341 | 160 | 120 | .5 | 1.54 | 80 |

The purity of the above fractions was determined by infra-red analysis.

The use of a packed column of similar size filled with one-quarter inch glass helices to separate the above components was unsuccessful under similar conditions.

*Example 5.—Fractional distillation of diallylphenyl phosphite (>ninety percent pure) involving separation of triallyl phosphite, diallylphenyl phosphite, and diphenylallyl phosphite*

A mixture as described in Example 4 was subjected to a fractional vacuum distillation by the Thermal Contact Rectification Column of this invention with the resuts given below. (A similar forecut and residue were obtained—cf. Example 4).

| Compound | Composite Weight, grams | Average Conditions | | | $n_d^{25}$ | Purity, percent |
|---|---|---|---|---|---|---|
| | | Pot, °C | Head °C. | Vac., mm. | | |
| Diallylphenyl Phosphite | 1,590 | 150 | 110 | 1 | 1.51 | >90 |

*Example 6.—Fractional distillation of triallyl phosphite (>ninety-five percent pure) involving separation of triallyl phosphite and nonyl phenol*

A mixture (152 grams) of triallyl phosphite and nonyl phenol was subjected to a fractional vacuum distillation by the Thermal Rectification Column of this invention with the results given below.

(The fractional distillation was carried out in a manner similar to that described above under "General Operation of the Thermal Contact Rectification Still.")

A forecut was taken which consisted mainly of triallyl phosphite, with the residue being mainly nonyl phenol.

| Compound | Composite Weight, grams | Average Conditions | | | $n_d^{25}$ | Purity, percent |
|---|---|---|---|---|---|---|
| | | Pot, °C | Head °C. | Vac., mm. | | |
| Triallyl Phosphite | 24 | 115 | 90 | 1.5 | 1.46 | >95 |

The use of a packed column (of similar size filled with one-quarter inch glass helices) to separate the above components under similar conditions was unsuccessful.

*Example 7.—Fractional distillation of triallyl phosphate (>ninety percent pure) involving separation of triallyl phosphate and phenol*

A mixture (100 grams) of triallyl phosphate and phenol was subjected to a fractional vacuum distillation by the Thermal Contact Rectification Column of this invention with the results indicated below.

A forecut was taken which was mostly phenol, while the residue was mainly triallyl phosphate.

| Compound | Composite Weight, grams | Average Conditions | | | Purity, percent |
|---|---|---|---|---|---|
| | | Pot, °C | Head, °C. | Vac., mm. | |
| Triallyl | 22 | 90 | 70 | 1.5 | >90 |

The use of a packed column (of similar size filled with one-quarter inch glass helices) to separate the above components under similar conditions was unsuccessful.

Although this invention has been illustrated and defined herein in terms of the above examples, it is to be understood that these are by no means all inclusive. Various modifications to the invention herein set out will suggest themselves to those skilled in the art. These are intended to be comprehended within the spirit of this invention.

I claim:

1. A combined thermal-contact rectification system comprising in combination, a container for a liquid feed material to be rectified, means for heating said container, a distillation column connected to a vacuum source and having an outer wall surface, a plurality of hollow contacting protuberance structures, rigidly disposed within the distillation column, each of said contacting structures having an outward, open base coextensive with said outer wall surface of the distillation column, each of said contacting structures projecting inwardly from said outer surface and terminating in a closed end at a distance from said outer surface greater than the radius of the distillation column, heating means circumferentially disposed around the exterior of the column, cooling means circumferentially disposed around the exterior of the column, said heating and cooling means being alternately disposed along the length of the column so as to effect formation of alternating hot and cold zones disposed substantially vertically within the column, each of said hot and cold zones being integrally connected and forming a continuous series of hot and cold zones in said column, the heating and cooling means further being in direct thermal contact with said open base of the contacting structures, and a reflux splitter including a condenser which is connected to the top of said column, said reflux splitter being in communication with said vacuum source, a reflux distillate receiver connected to and communicating with said reflux splitter, and valve means between said splitter and said receiver for selectively controlling the amount of distillate diverted to the receiver from that condensed by said reflux splitter and being returned to the top of said column.

2. The rectification system as claimed in claim 1 wherein the heating means are electrical heaters and the cooling means is a gas manifold having spaced outlets through which a cooling gas is directed onto the surface of the distillation column.

3. The rectification system as claimed in claim 1 wherein the hollow contacting protuberance structures are filled with a heat conductive material.

4. The rectification system as claimed in claim 2 wherein the hollow contacting protuberance structures are filled with a heat conductive material.

5. The rectification system as claimed in claim 3 wherein the heat conductive material is aluminum foil.

6. The rectification system as claimed in claim 4 wherein the heat conductive material is aluminum foil.

References Cited by the Examiner
UNITED STATES PATENTS

| | | | |
|---|---|---|---|
| 1,942,767 | 1/1934 | Oman et al. | 202—40 |
| 2,400,021 | 5/1946 | Podbielniak | 202—161 X |
| 2,415,411 | 2/1947 | Bowman | 202—158 X |
| 2,477,595 | 8/1949 | Goldsbarry | 202—40 |

NORMAN YUDKOFF, *Primary Examiner.*

ALPHONSO SULLIVAN, *Examiner.*